United States Patent
Kurokami et al.

(10) Patent No.: US 7,079,406 B2
(45) Date of Patent: Jul. 18, 2006

(54) POWER CONVERTING APPARATUS, CONTROL METHOD THEREFOR, AND SOLAR POWER GENERATION APPARATUS

(75) Inventors: Seiji Kurokami, Kyoto (JP); Naoki Manabe, Ibaraki (JP); Nobuyoshi Takehara, Kyoto (JP)

(73) Assignee: Canon Kabushiki Kaisha, Tokyo (JP)

( * ) Notice: Subject to any disclaimer, the term of this patent is extended or adjusted under 35 U.S.C. 154(b) by 258 days.

(21) Appl. No.: 09/818,604

(22) Filed: Mar. 28, 2001

(65) Prior Publication Data

US 2001/0048605 A1 Dec. 6, 2001

(30) Foreign Application Priority Data

Mar. 29, 2000 (JP) .................. 2000-092087

(51) Int. Cl.
*H02H 7/122* (2006.01)
(52) U.S. Cl. .............. 363/56.03; 323/906; 361/49
(58) Field of Classification Search ........... 363/56.2, 363/56.1, 56.3, 56.4, 98, 132; 361/49, 58, 361/42, 45, 48; 323/225, 299, 235, 906
See application file for complete search history.

(56) References Cited

U.S. PATENT DOCUMENTS

| | | | | |
|---|---|---|---|---|
| 3,975,663 A | * | 8/1976 | Moorey | 361/42 |
| 5,523,938 A | * | 6/1996 | Wagner et al. | 363/53 |
| 5,621,300 A | | 4/1997 | Sato et al. | 320/5 |
| 5,669,987 A | | 9/1997 | Takehara et al. | 136/243 |
| 5,706,153 A | * | 1/1998 | Innes et al. | 363/31 |
| 5,751,133 A | | 5/1998 | Sato et al. | 320/2 |
| 5,869,956 A | | 2/1999 | Nagao et al. | 323/299 |
| 5,892,354 A | | 4/1999 | Nagao et al. | 363/95 |
| 5,923,158 A | | 7/1999 | Kurokami et al. | 323/299 |
| 5,986,354 A | | 11/1999 | Nagao et al. | 307/43 |
| 6,046,919 A | * | 4/2000 | Madenokouji et al. | 363/98 |
| 6,069,811 A | * | 5/2000 | Moriguchi et al. | 363/142 |
| 6,101,073 A | | 8/2000 | Takehara | 361/42 |
| 6,111,767 A | * | 8/2000 | Handleman | 363/95 |
| 6,320,769 B1 | * | 11/2001 | Kurokami et al. | 363/56.03 |

FOREIGN PATENT DOCUMENTS

| | | |
|---|---|---|
| EP | 0 679 898 | 11/1995 |
| EP | 0 878 850 | 11/1998 |
| EP | 0 884 817 A2 | 12/1998 |
| JP | 8-136602 | 5/1996 |
| JP | 09 084254 | 3/1997 |
| JP | 09 285015 | 10/1997 |
| JP | 2000 023371 | 1/2000 |

* cited by examiner

*Primary Examiner*—Rajnikant B. Patel
(74) *Attorney, Agent, or Firm*—Fitzpatrick, Cella, Harper & Scinto

(57) ABSTRACT

The object is to reliably detect a ground fault of a solar battery. To detect a ground fault position to take an efficient measure against the ground fault, DC power input from a solar battery is converted into AC power and supplied to a system. In a system interconnection inverter (utility connected inverter) having non-insulated input and output, the input voltage of a converter circuit and/or the intermediate voltage between the converter circuit and an inverter circuit are varied to control the potential to ground at each portion of the solar battery to a value other than a value close to zero.

17 Claims, 9 Drawing Sheets

POWER CONVERTING APPARATUS, CONTROL METHOD THEREFOR, AND SOLAR POWER GENERATION APPARATUS

FIELD OF THE INVENTION

The present invention relates to a power converting apparatus, control method therefor, and solar power generation apparatus and, more particularly, to an inverter which receives power output from a DC power supply and outputs AC power to a commercial power system (electric utility) having a line grounded.

BACKGROUND OF THE INVENTION

In recent years, research and development of new clean energies have been encouraged along with buildup of environmental awareness, and solar power generation systems using solar batteries for directly converting the optical energy of the sun into an electrical energy are proliferating. Especially, system interconnection solar power generation systems (utility connected PV systems) in which DC power generated by a solar battery is converted into AC power by an inverter and output to a commercial power system are making a great market. The commercial power system (electric utility) will be simply referred to as a "system", and the inverter used for interconnection (utility connection) as a "system interconnection inverter" hereinafter.

In a solar battery, insulation may be damaged due to some reason to cause a ground fault. Generally, insulation can be checked by measuring the insulation resistance value using an insulation resistance tester. In many cases, however, since the insulation resistance value is measured by routine inspection once for several months or years, a ground fault may be left undetected for a long period. To prevent this, a system interconnection inverter has a ground fault detector for detecting a ground fault of a solar battery.

Many recent system interconnection inverters (utility connected inverters) are so-called transformerless type inverters that use no insulation transformer from the viewpoint of size, mass, performance, and cost. A ground fault detector used in a transformerless type system interconnection inverter (a transformerless type utility connected inverter) generally uses a scheme of detecting a ground current that flows from the solar battery to the commercial power system through the system interconnection inverter because a potential to ground is supplied from the system to the solar battery. An example of this scheme is described in, e.g., Japanese Patent Publication No. 63-49455.

However, this ground fault detection scheme has the following problems. In this scheme, to detect a ground fault generated in a solar battery, a ground current that flows through a circuit formed by solar battery—power conditioner—system—ground—solar battery is detected. This circuit forms when a ground fault occurs in the solar battery. The ground fault is generated by the potential difference (potential to ground) between ground and the ground fault portion of the solar battery. A solar battery sometimes has a portion where the potential to ground is zero or close to zero. When a ground fault takes place at that portion where the potential to ground is zero or close to zero, the ground current is zero or very small, so the ground fault cannot be detected.

As described above, a solar battery has a portion (to be referred to as a "dead region" hereinafter) where a ground fault that has occurred in the solar battery during operation cannot be detected. In activating a solar power generation system, the output voltage of the solar battery shifts from the open voltage to the optimum operating point voltage. Since the potential to ground changes at this time, a ground fault can be detected in some cases. However, if the time for which the detectable ground current flows is short, the ground fault detector of the above scheme cannot detect the ground fault.

In many cases, the system interconnection inverter performs MPPT (Maximum Power Point Tracking) control to extract the maximum output from the solar battery, thereby changing the output voltage of the solar battery. However, the optimum operating point voltage of the solar battery does not largely change. The degree of a change in operating voltage of the solar battery is actually not so large, and no ground fault can be detected yet. Although a ground fault can be detected at the time of activation of the solar power generation system, a ground fault generated after the start of operation cannot be detected, and the solar power generation system may be continuously operated.

When a ground fault is generated in the dead region where the potential to ground is close to zero, there is nothing to worry about electrical shock, though the ground fault is preferably detected at early stage for quick repair.

Additionally, in the system interconnection inverter, although a ground fault can be detected, its position cannot be determined. Furthermore, because of a change in state after ground fault detection, the ground fault position of the solar battery may be unknown even by check operation done later. This also applies when a, DC power supply such as a battery other than a solar battery or a fuel cell is used.

SUMMARY OF THE INVENTION

The present invention has been made to solve the above problems, and has as its object to reliably detect a ground fault of a DC power supply in a power converting apparatus which is interconnected to a system and has non-insulated input and output.

In order to achieve the above object, a preferred embodiment of the present invention discloses a power converting apparatus having a non-insulated converter and a non-insulated inverter to convert direct current power inputted from a power supply to alternating current power and to supply the alternating current power to a commercial power system which is grounded, said apparatus comprising: a detector for detecting a ground fault of the supply; and a controller for varying an input voltage of the converter and/or an intermediate voltage between the converter and the inverter so as to control a potential to ground of the power supply.

It is another object of the present invention to detect a ground fault position to take a measure against the ground fault in a short time.

In order to achieve the above another object, a preferred embodiment of the present invention also discloses a power converting apparatus having a non-insulated converter and a non-insulated inverter to convert direct current power inputted from a power supply to alternating current power and to supply the alternating current power to a commercial power system which is grounded, said apparatus comprising: a detector for detecting a ground fault of the supply; and a controller for varying an input voltage of the converter and/or an intermediate voltage between the converter and the inverter so as to control a potential to ground of the power supply, wherein the detector detects the ground fault at least at two detection levels, and upon detecting the ground fault, outputs a ground current value, and when the ground fault is detected, the controller records information related to the ground fault in a memory for each detection level.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

A solar power generation system according to an embodiment of the present invention will be described below in detail with reference to the accompanying drawings.

Figure 1:
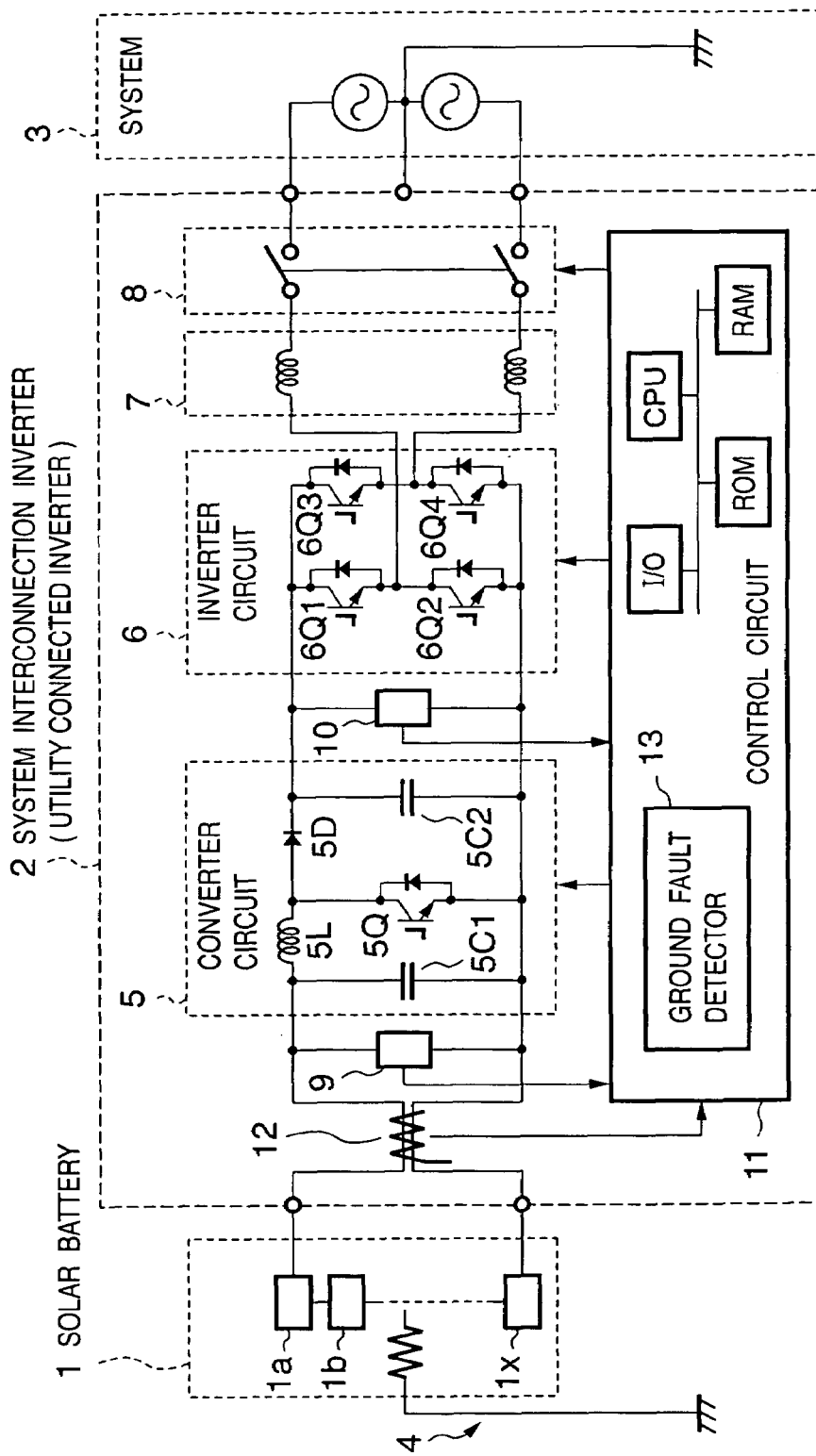
FIG. 1 is a block diagram showing the arrangement of a system interconnection inverter (an utility connected inverter) according to an embodiment.

FIG. 1 is a block diagram showing the arrangement of a system interconnection inverter (an utility connected inverter) 2 according to this embodiment. This system interconnection inverter 2 receives a DC power input from a DC power supply 1, converts the DC power into AC power through a converter circuit 5 and inverter circuit 6 with non-insulated input and output, and outputs the AC power to a grounded system 3. The system interconnection inverter 2 also has a ground fault detector 13 for detecting a ground fault of the DC power supply 1, and a control circuit 11 which performs control, e.g., controls the input voltage and the intermediate voltage between the converter circuit 5 and the inverter circuit 6 to boost or drop the voltage, thereby causing the potential to ground of the DC power supply 1 to have a value other than a value close to zero.

The output from the solar battery 1 is connected to the input terminal of the system interconnection inverter 2. The output terminal of the system interconnection inverter 2 is connected to the system 3. The solar battery 1 is constituted as a solar battery string having a plurality of solar battery modules 1a to 1x connected in series such that a voltage appropriate to the input voltage of the system interconnection inverter 2 can be output. One solar battery module may suffice as long as a desired voltage can be obtained. Although not illustrated, a plurality of solar battery strings are often connected in parallel to obtain desired power. The present invention can be applied even when another DC power supply such as a fuel cell or a battery is used in place of the solar battery 1.

Referring to FIG. 1, reference numeral 4 denotes a ground fault generated in the solar battery 1. The system 3 is a single-phase three-wire electrical system, and its neutral point is grounded. The present invention can be applied to any other grounded system such as single-phase three-wire system, three-phase three-wire system, or three-phase four-wire system. The main circuit of the system interconnection inverter 2 comprises the converter circuit 5, inverter circuit 6, interconnection reactor 7, and interconnection switch 8.

The converter circuit 5 is a so-called chopper-boost DC-to-DC converter constructed by a capacitor 5C1 for smoothing the input voltage to the converter, a boost reactor 5L, a switching element 5Q which switches to control the boost ratio, a diode 5D for preventing any backflow from the output side to the input side of the converter, and a capacitor 5C2 for smoothing the output voltage of the converter. As the switching element 5Q, an IGBT (Isolated Gate Bipolar Transistor) is used. However, a self extinction type element such as a MOSFET may be used. The capacitor 5C2 also has a function of smoothing the input voltage to the inverter circuit 6 on the output side.

The inverter circuit 6 is constituted as a full-bridge circuit having switching elements 6Q1 to 6Q4. As each of the switching elements 6Q1 to 6Q4, an IGBT is used. However, a self extinction type element such as a MOSFET may be used. The interconnection reactor 7 obtains a sinusoidal AC current from a rectangular switching voltage. The interconnection switch 8 disconnects the solar power generation system from the system 3 when the system interconnection inverter 2 is not operating.

An input voltage detector 9 detects the voltage input to the system interconnection inverter 2 and outputs an input voltage detection signal representing the input voltage to the control circuit 11. An intermediate voltage detector 10 detects the voltage (to be referred to as an "intermediate voltage") at the intermediate portion that is either the output from the converter circuit 5 or the input to the inverter circuit 6, and outputs an intermediate voltage detection signal representing the voltage to the control circuit 11.

A current detector 12 detects the differential current between the current of the positive line and that of the negative line on the input side, and the ground fault detector 13 determines a ground fault on the basis of whether the detected value has a predetermined level or more, and outputs the result to the control circuit 11 as a ground fault determination signal. The current detector 12 need not always be located on the input line of the system interconnection inverter 2, and can be placed at any position, e.g., on the output line of the system interconnection inverter 2 or between the converter circuit 5 and the inverter circuit 6 (to be referred to as an "intermediate line") as long as the differential current between the current of the positive line and that of the negative line can be detected.

The control circuit 11 controls the operation of the system interconnection inverter 2 on the basis of the input voltage detection signal, intermediate voltage detection signal, and ground fault determination signal, or other detection signal (not shown). The control circuit 11 also performs switching control of the converter circuit 5 and inverter circuit 6 and ON/OFF-control of the interconnection switch 8 in accordance with the state. The control circuit 11 executes functions prepared in a general system interconnection inverter, i.e., boost control, output waveform control, activation/stop control, MPPT control, interconnection protection, and inverter protection. The control circuit 11 also has a potential-to-ground control function for ground fault detection (to be described later).

The control circuit 11 can be constructed by a digital circuit such as a CPU, DSP (Digital Signal Processor), memory, and I/O, or an analog circuit. Recent CPUs and DSPs enjoy high performance and cost reduction. When these units are used, various kinds of control operations can be implemented by software, resulting in advantages such as size reduction, cost reduction, and improvement of the degree of freedom in design. The input voltage and intermediate voltage of the system interconnection inverter 2 are controlled by adjusting the ON/OFF ratio (duty ratio) of the converter circuit 5 or inverter circuit 6.

The circuit arrangements of the converter circuit 5 and inverter circuit 6 in the present invention are not limited to those shown in FIG. 1. The present invention can be applied as far as the system interconnection inverter 2 has non-insulated input and output, and the position where the potential to ground of the solar battery 1 becomes zero changes when the input voltage and/or intermediate voltage changes. The potentials to ground on the input side of the system interconnection inverter 2 are determined by the input voltage and intermediate voltage as $$VB = -Vm/2$$

$$VA = -Vm/2 + Vi$$

where

VB: voltage to ground of the negative line

VA: voltage to ground of the positive line

Vm: intermediate voltage

Vi: input voltage

In the entire solar battery 1, a potential to ground ranging from VA to VB is present. Normally, since the input voltage Vi and intermediate voltage Vm are almost constant during operation, the voltages VA and VB to ground are also almost constant, and the potential to ground of the solar battery 1 is almost constant. The input voltage Vi and/or intermediate voltage Vm is controlled at a predetermined timing to make the absolute value of the potential to ground of the solar battery 1 large, thereby allowing ground fault detection. In the normal operation mode, the input voltage Vi is determined and controlled to an almost constant voltage by MPPT control for extracting the maximum output from the solar battery 1. That is, the potential to ground of the solar battery 1 is fixed.

First Embodiment

Ground fault detection operation in a system interconnection inverter (an utility connected inverter) 2 according to the first embodiment will be described next. The system interconnection inverter 2 has the same arrangement as in FIG. 1. In the first embodiment, an intermediate voltage Vm is kept constant, and only an input voltage Vi is changed.

Figure 2:
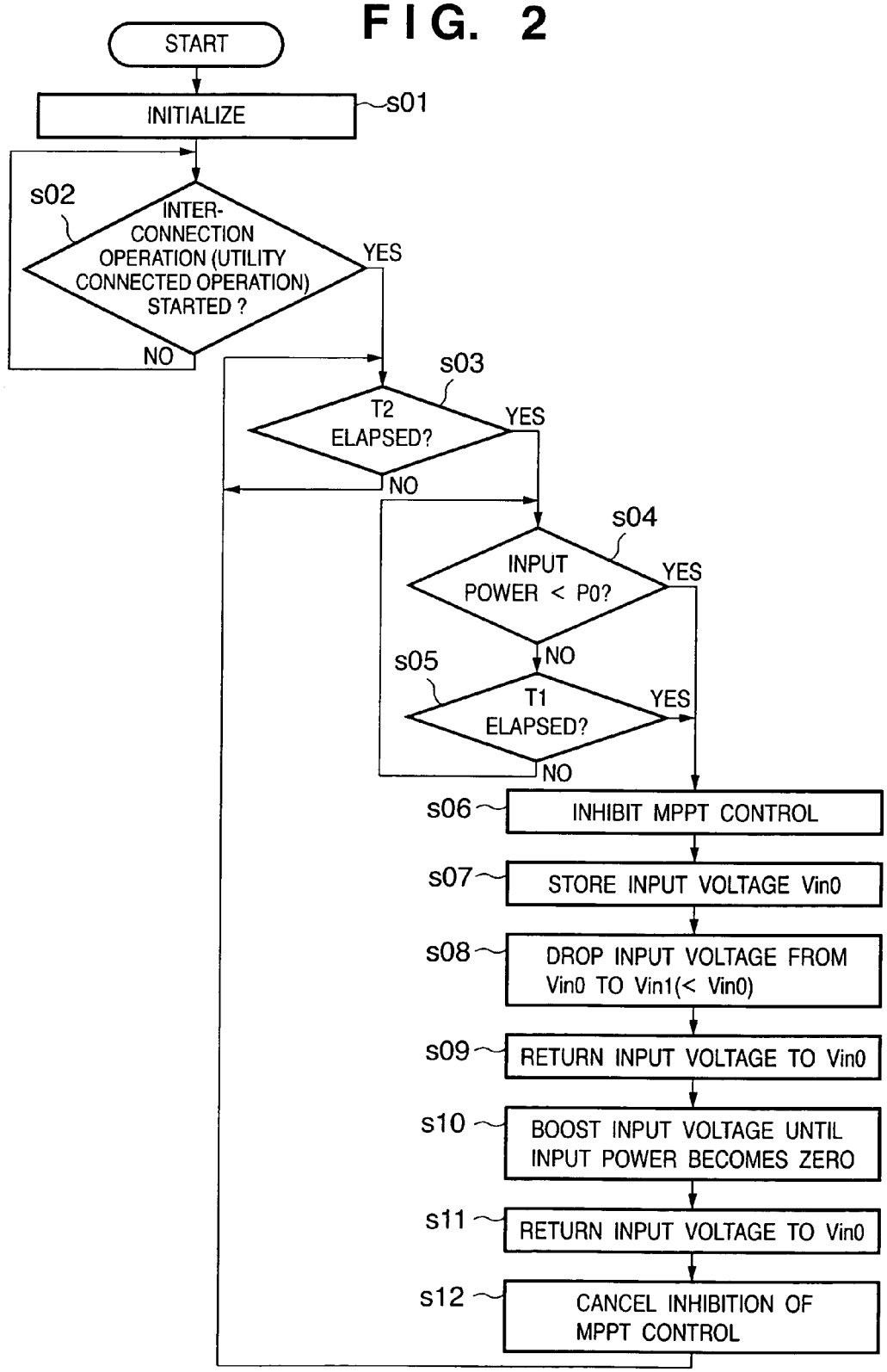
FIG. 2 is a flow chart showing voltage control in ground fault detection operation.

FIG. 2 is a flow chart showing voltage control in the ground fault detection operation. The voltage control is executed by a control circuit 11. When the control circuit 11 starts operating, various initialization operations are executed in step s01, as shown in FIG. 2. The control waits until interconnection operation (utility connected operation) starts in step s02. If YES in step s02, the flow advances to step s03.

It is determined in step s03 whether the time (to be referred to as an "operation time") from the start of interconnection operation exceeds a second predetermined time T2. If YES in step s03, the flow advances to step s04. Otherwise, the flow returns to step s03.

In step s04, the input power is compared with predetermined power P0. If the input power is smaller than the power P0, it is determined that voltage control for ground fault detection should be executed, and the flow advances to step s06. If the input power is equal to or larger than the power P0, it is determined that voltage control for ground fault detection is still unnecessary, and the flow advances to step s05.

It is determined in step s05 whether the operation time exceeds a first predetermined time T1 (>T2). If YES in step s05, it is determined that voltage control for ground fault detection should be executed, and the flow advances to step s06. Otherwise, the flow returns to step s04.

That is, while the input power is equal to or larger than the predetermined power P0, and the operation time is shorter than the time T1, steps s04 and s05 are repeated.

In step s06, MPPT control that has been performed is inhibited. In step s07, an input voltage Vin0 at this time is stored. In step s08, the input voltage Vi is changed from Vin0 to a lowest input voltage Vin1 (<Vin0) of the system interconnection inverter 2 at a predetermined rate of change. With this operation, the potential to ground of a solar battery 1 changes. If a ground fault is detected during the period when the input voltage Vi is being dropped, the change in input voltage Vi is stopped, and processing in FIG. 3 for ground fault detection is executed.

Figure 3:
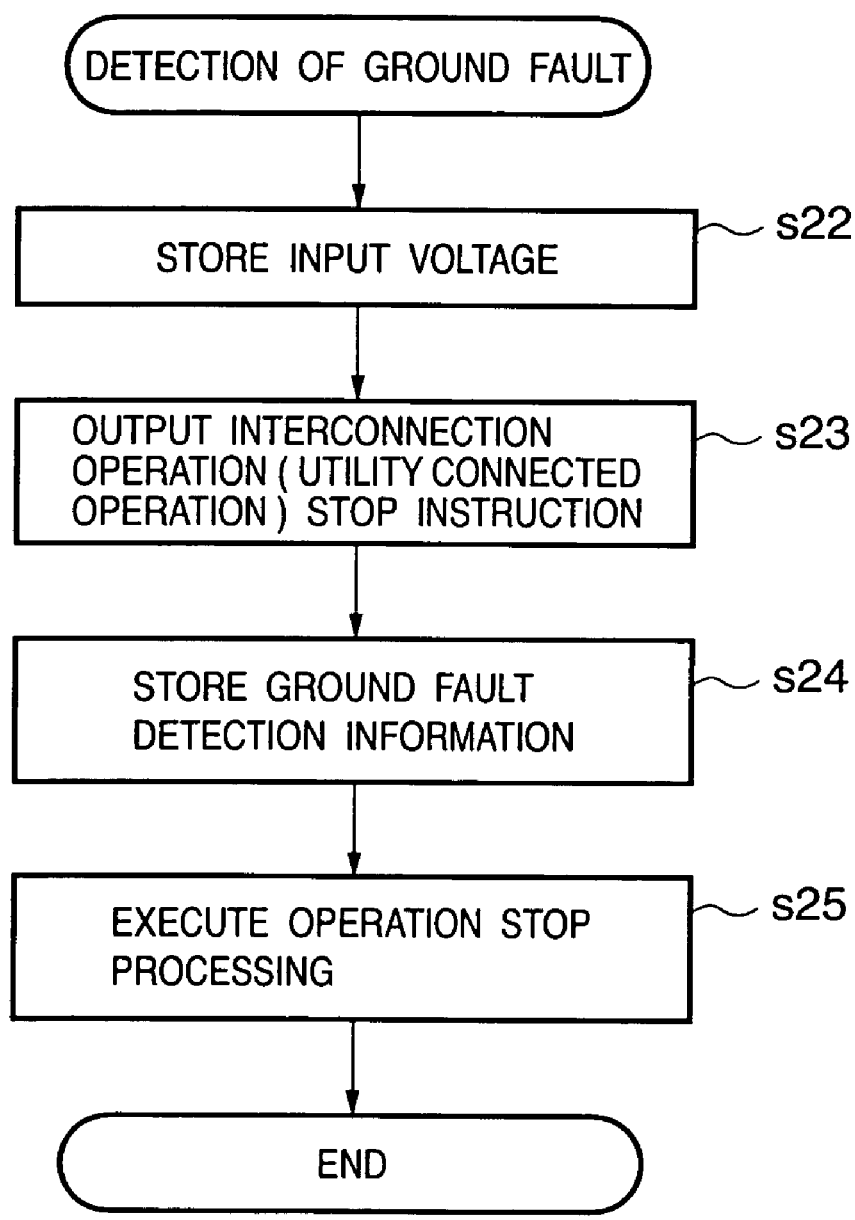
FIG. 3 is a flow chart showing the operation sequence after ground fault detection.

That is, when a ground fault is detected, control shown in FIG. 3 is executed. In step s22, the input voltage and intermediate voltage at the time of ground fault detection are stored in the memory. In step s23, an interconnection operation (utility connected operation) stop instruction is output. In step s24, ground fault detection information representing that a ground fault is detected, the time of detection, and the like is stored together with the input voltage and the like. In step s25, operation stop processing is executed. The ground fault detection information is stored in, e.g. a memory in the control circuit 11, which is backed up by a battery.

If no ground fault is detected in step s08, the flow advances to step s09 to quickly change the input voltage Vi to Vin0 to minimize the electric energy loss due to a decrease in power generation efficiency of the solar battery 1. In step s10, the input voltage Vi is boosted from Vin0 at a predetermined rate of change until the input power obtains a predetermined value close to zero. This predetermined value is preferably set to be slightly larger than the no load loss of the system interconnection inverter 2. Instead of making the input power close to zero, the output power may be made close to zero. Even in this case, the result does not change. If a ground fault is detected while the input voltage Vi is being boosted, the same processing for ground fault detection as that for ground fault detection in step s08 is executed.

If no ground fault is detected in step s10, the flow advances to step s11 to quickly change the input voltage Vi to Vin0 to minimize the electric energy loss due to a decrease in power generation efficiency of the solar battery 1. In step s12, inhibition of MPPT control is canceled to resume the MPPT control, and the flow returns to step s03. After returning to step s03, the time from cancel of inhibition of MPPT control is used as the operation time in steps s03 and s05.

With the above operation, control can be executed to reliably change the potential to ground of the solar battery 1 within the first predetermined time T1. In controlling to vary the potential to ground, since the input voltage is varied, the solar battery 1 deviates from an optimum operating point, and the power generation efficiency of the solar battery 1 slightly lowers. However, since the control to vary the potential to ground is performed when the power generated by the solar battery 1 is small, and execution of the control to vary the potential to ground is inhibited during the second predetermined time T2, any decrease in power generation efficiency of the solar battery 1 can be suppressed.

Figure 4:
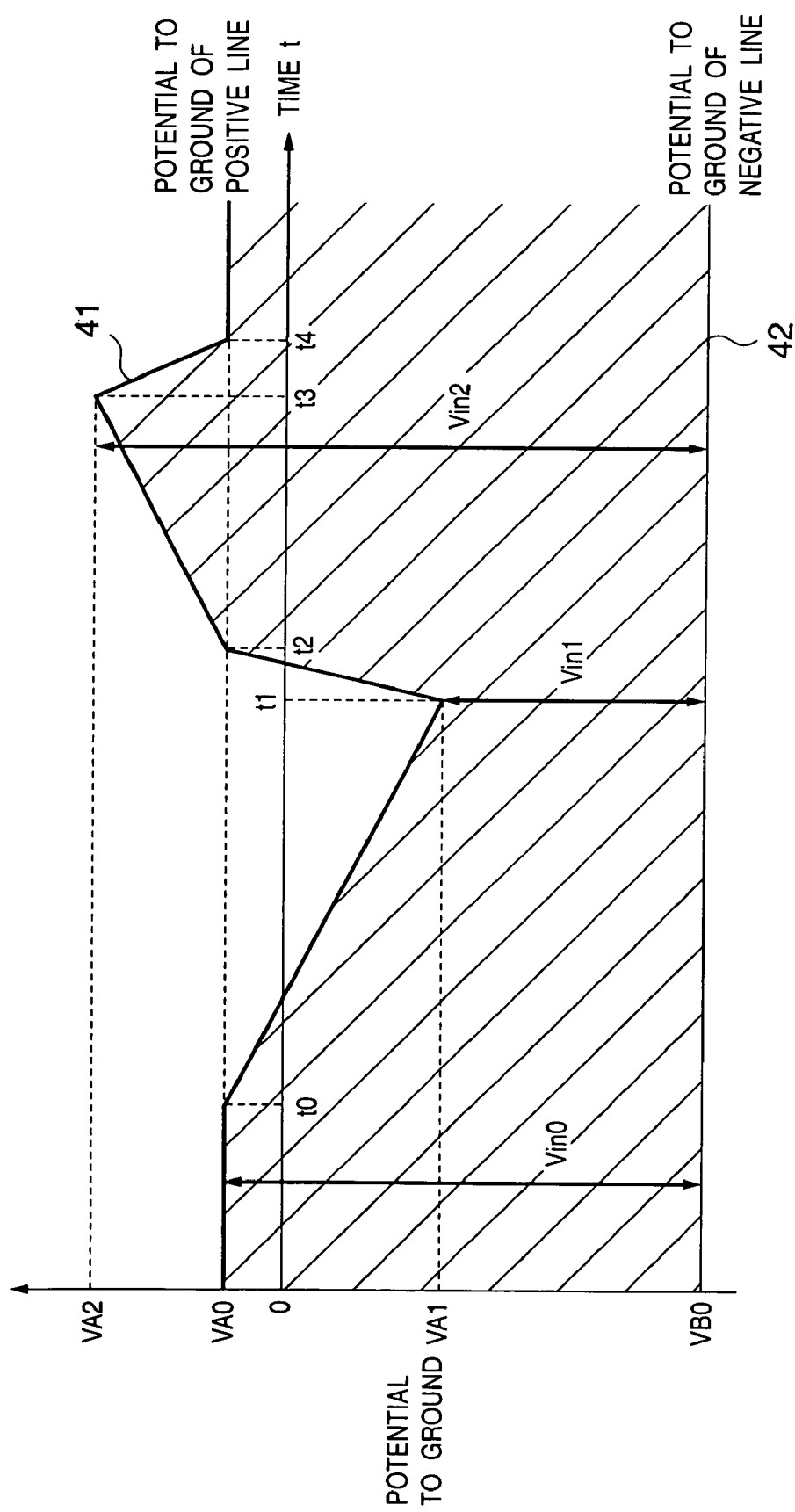
FIG. 4 is a graph showing a change in potential to ground of a solar battery in the sequence shown in FIG. 2.

The potential to ground of the solar battery 1 in this control operation will be described next with reference to FIG. 4. The abscissa in FIG. 4 represents time, and the ordinate represents the potential to ground of the solar battery 1. FIG. 4 is a graph showing a variation in potential to ground of the solar battery 1 in the above control. Referring to FIG. 4, a line 41 represents a potential to ground of the positive line of the solar battery 1. A line 42 represents a potential to ground of the negative line of the solar battery 1. The solar battery 1 has a potential to ground within the range between the two lines 41 and 42.

Normal operation continues until time t0. During this period, the potential to ground of the positive line of the solar battery 1 is fixed to VA0, and the potential to ground of the negative line is fixed to VB0. This state continues unless the potential to ground is changed. Control to vary the potential to ground is executed from the time t0.

The period from the time t0 to t1 corresponds to the state in step s08. During this period, the input voltage Vi is dropped from Vin0 to Vin1 at a predetermined rate of change. Finally, the potential to ground of the positive line of the solar battery 1 becomes VA1. During this period, the potential to ground of the negative line of the solar battery 1 remains VB0.

The period from the time t1 to t2 corresponds to the state in step s09. During this period, the input voltage Vi is quickly boosted from Vin1 to Vin0. As a result, the potential to ground of the positive line of the solar battery 1 returns to VA0, and that of the negative line of the solar battery 1 remains VB0.

The period from the time t2 to t3 corresponds to the state in step s10. During this period, the input voltage Vi is boosted at a predetermined rate of change. At the time t3, the input power has a predetermined value which is close to zero and larger than the non-load loss. At this time, the input voltage is Vin2. The potential to ground of the positive line of the solar battery 1 is VA2, and that of the negative line remains VB0.

The period from time t3 to t4 corresponds to the state in step s11. During this period, the input voltage Vi is quickly dropped from Vin2 to Vin0. At the time t4, the control to vary the potential to ground is temporarily ended. The potential to ground of the positive line of the solar battery 1 returns to VA0, and that of the negative line of the solar battery 1 remains VB0. From the time t4, normal operation is restored.

In this way, the potential to ground of the solar battery 1 is controlled so the voltage does not come close to zero with respect to the ground potential at each portion of the solar battery 1. Especially, in the system interconnection inverter in which the potential to ground of the negative line is VB0 and the lowest input voltage is Vin1, as shown in FIG. 4, the magnitude of the potential to ground of the solar battery 1 can be made |VA1| or more. For this reason, a ground fault of a predetermined level or more (ground fault resistance value determined by |VA1| and the detection sensitivity of the ground fault detector 13) can be reliably detected. When the open-circuit voltage of the solar battery 1 is as large as Vin2, a potential to ground as large as VA2 can be given to the solar battery 1 by controlling to boost the input voltage Vi. Hence, it can be confirmed that the insulation resistance is maintained with a resistance value larger than the ground fault of the predetermined level or more.

Assume specifications in which the intermediate voltage Vm of the system interconnection inverter 2 is 320 V, the lowest input voltage Vin1 is 100 V, and the level (ground fault detection level) at which a ground fault detector 13 detects a ground fault is 25 mA. When the optimum operating point voltage of the solar battery 1 is 190 V, the potential VB0 to ground of the negative line of the solar battery is −160 V. The input voltage Vin0 in the normal operation mode is 190 V. When the voltage of the solar battery 1 is boosted, and the power is reduced to a predetermined value, the input voltage is about 240 V. That is, the voltage Vin2 is 240 V. When the input voltage at the time t1 is Vin1, the potential VA1 to ground of the positive line is −60 V. When the input voltage at the time t3 is Vin2, the potential VA2 to ground of the positive line is +80 V.

Figure 5:
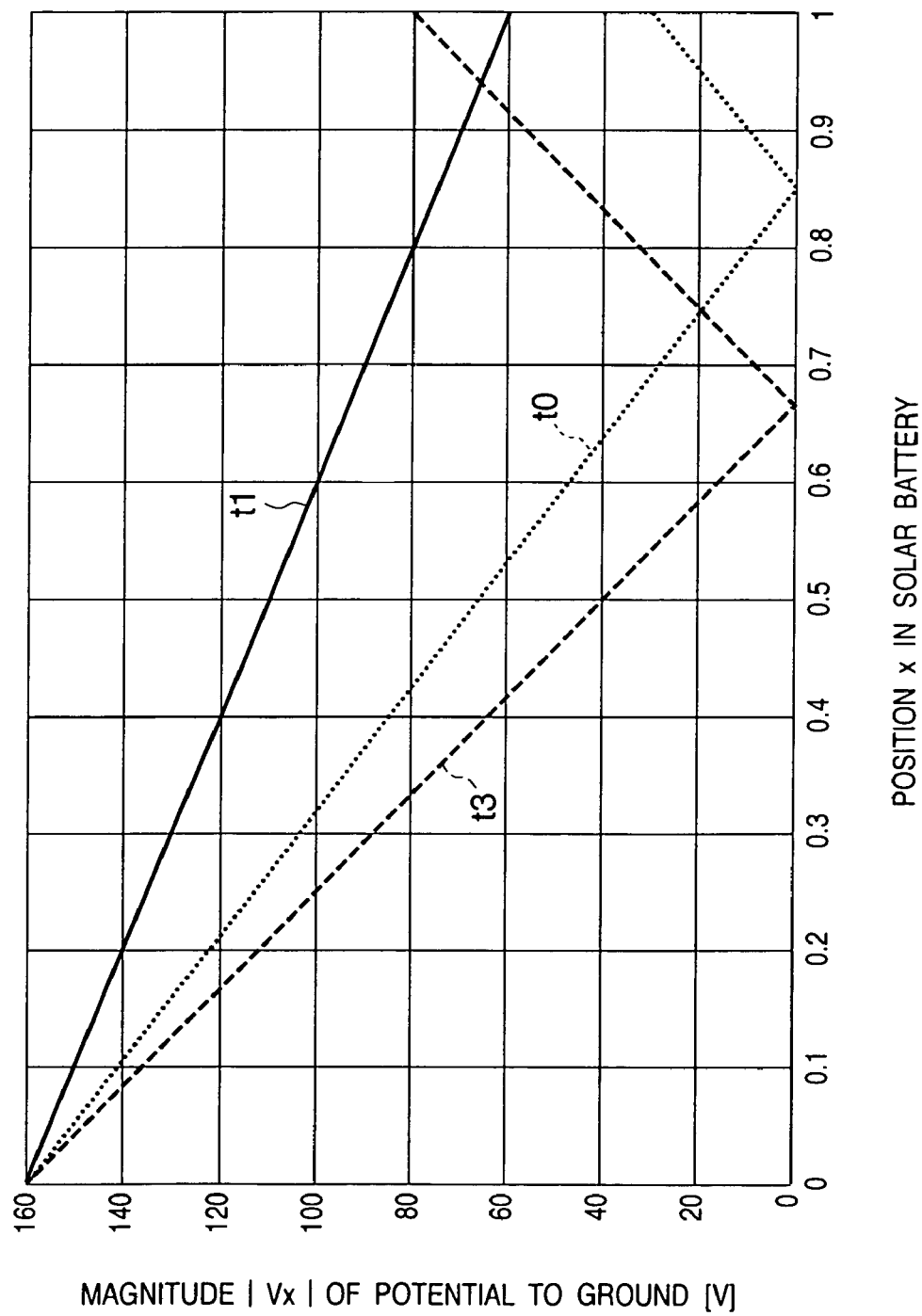
FIG. 5 is a graph showing the magnitudes of the potential to ground at each portion of the solar battery at times t1 and t3 shown in FIG. 4.

The position of the negative terminal of the solar battery 1 is represented by 0, the position of the positive terminal is represented by 1, and an arbitrary position in the solar battery 1 is represented by x ($0 \leq x \leq 1$). Let Vin be the input voltage, and VB be the potential to ground of the negative line. A potential Vx to ground at the arbitrary position x in the solar battery 1 is given by Vx=Vin×x+VB. FIG. 5 shows the magnitudes |Vx| of the potential to ground at the arbitrary position x in the solar battery 1 at the times t1 and t3. Referring to the graph of FIG. 5, the abscissa represents the position x in the solar battery 1, and the ordinate represents the magnitude |Vx| of the potential to ground (unit: volt). At the time t1, at least 60 V is ensured as the magnitude |Vx| of the potential to ground, as is indicated by the solid line t1 in FIG. 5. At the time t3, as the magnitude |Vx| of the potential to ground, a value lager than that at the time t1 is ensured in a region where the position x in the solar battery 1 is 0.94 or more, as is indicated by the broken line t3. Hence, when the lines t1 and t3 are taken into consideration, the magnitude |Vx| of the potential to ground is minimized at 66 V when the position x is 0.94.

At the time t0 in the normal operation mode, the distribution of potentials to ground is indicated by the dotted line t0. That is, the potential to ground is close to zero near the position x represented by 0.84. Conventionally, since the potential to ground is fixed to the state indicated by the dotted line t0, a ground fault near the position x represented by 0.84 (dead region) is particularly hard to detect. However, according to the first embodiment, a sufficient potential to ground is given even near the position x represented by 0.84.

Figure 6:
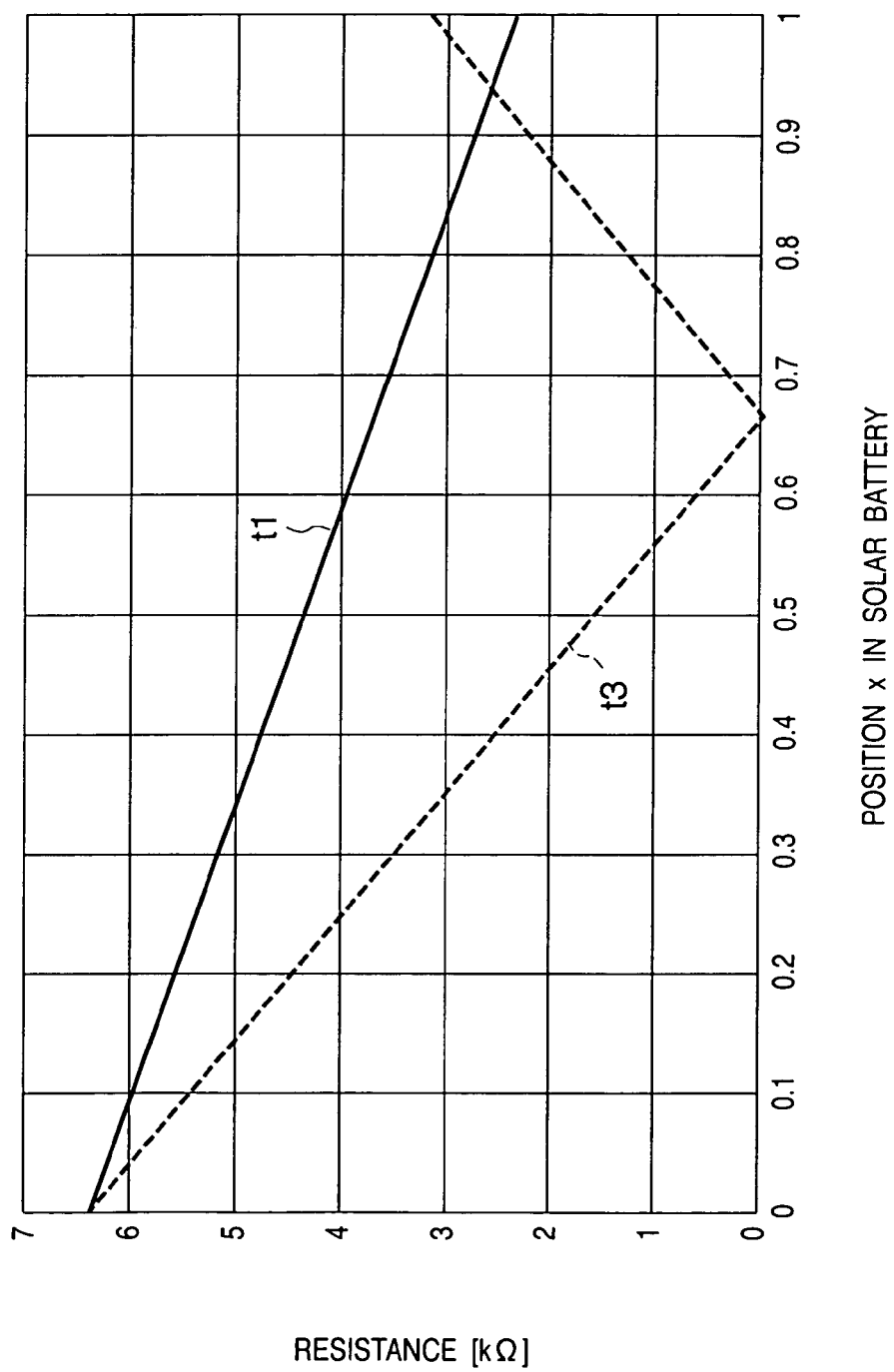
FIG. 6 is a graph showing the boundaries of detectable ground fault resistance values at the times t1 and t3 shown in FIG. 4.

FIG. 6 is a graph showing the boundaries of detectable ground fault resistance values that are obtained from the values shown in FIG. 5 and the ground fault detection level (25 mA) of the ground fault detector 13. The abscissa represents the position x in the solar battery 1, and the ordinate represents the resistance value between the position x and the ground potential. The region below the solid line t1 or broken line t3 is a region where a ground fault can be detected at the time t1 or t3. The region above the solid line t1 or broken line t3 is a region where a ground fault cannot be detected at the time t1 or t3. In other words, if no ground fault is detected in controlling the potential to ground, a resistance value above the solid line t1 or broken line t3 is ensured. The smallest resistance value is 2.6 kΩ at the position x represented by 0.94. If no ground fault is detected, a resistance value of 2.6 kΩ or more is ensured with respect to the ground potential in the entire solar battery 1. Conversely, when only a resistance value below the solid line t1 or broken line t3 is present with respect to the ground potential, a ground fault can be detected.

As described above, according to the first embodiment, in a system interconnection inverter having non-insulated input and output, the potential to ground of the solar battery is controlled by changing the input voltage, and a predetermined value or more except a value close to zero is ensured at all positions in the solar battery as the magnitude of the potential to ground of the solar battery, thereby detecting a ground fault in the dead region, which cannot be detected in normal operation. If no ground fault is detected in controlling the potential to ground, it is confirmed that a predetermined resistance value is maintained between the ground potential and each portion in the solar battery. In addition, the situations of the input voltage, intermediate voltage, and the like at the time of ground fault detection and the time of ground fault detection are recorded on the memory. After a ground fault occurs, the record is analyzed and used as reference for inspection of the ground fault generation situation.

Since the potential to ground is controlled within the first predetermined time T1, a ground fault can be detected within the first predetermined time T1 after the ground fault has occurred. Since the interval of control of the potential to ground is set to-the second predetermined time T2 or more, electric energy loss due to a decrease in power generation efficiency of the solar battery in controlling the solar battery can be suppressed. Since the potential to ground is controlled when the input or output power has a predetermined value or less, electric energy loss due to a decrease in power generation efficiency of the solar battery in controlling the solar battery can be suppressed.

When a ground fault is detected, the control waits for a predetermined time after the stop of operation of the system interconnection inverter. Then, the system interconnection inverter is operated again, and the potential to ground is controlled to repeat ground fault detection (to be referred to as "redetection") once or a plurality of number of times, thereby preventing any detection error due to external noise. In addition, when the ground fault state was canceled can be known.

In the circuit of the first embodiment, the lowest input voltage is as low as about 100 V. In this case, the potential to ground can be reliably given by controlling the input voltage to (almost) the lowest input voltage.

A ground fault can be accurately detected when the potential to ground is slowly changed by controlling the input voltage. Hence, in the redetection mode, the potential to ground is preferably varied at a rate of change lower than that in the normal mode.

When a ground fault is detected, the user is notified of the ground fault generation by an indicator or sound, or a device outside the building where the solar power generation system is installed is notified of the ground fault generation through a communication path so that the user can quickly take a measure against the ground fault. The ground fault detection operation of controlling the potential to ground may be executed at the start of interconnection operation or while the normal operation is stopped.

Furthermore, in the first embodiment, when the intermediate voltage is controlled to the predetermined fixed value, the recording of the detected intermediate voltage is not always necessary. The same effect is obtained by using the predetermined fixed value instead of the detected intermediate voltage.

Second Embodiment

The second embodiment will be described next. The system interconnection inverter (the utility connected inverter) of the second embodiment has the arrangement of a system interconnection inverter (an utility connected inverter) 2 shown in FIG. 1, as in the first embodiment. In the first embodiment, the input voltage is controlled to control the potential to ground. In the second embodiment, not only the input voltage but also the intermediate voltage is controlled.

Figure 7:
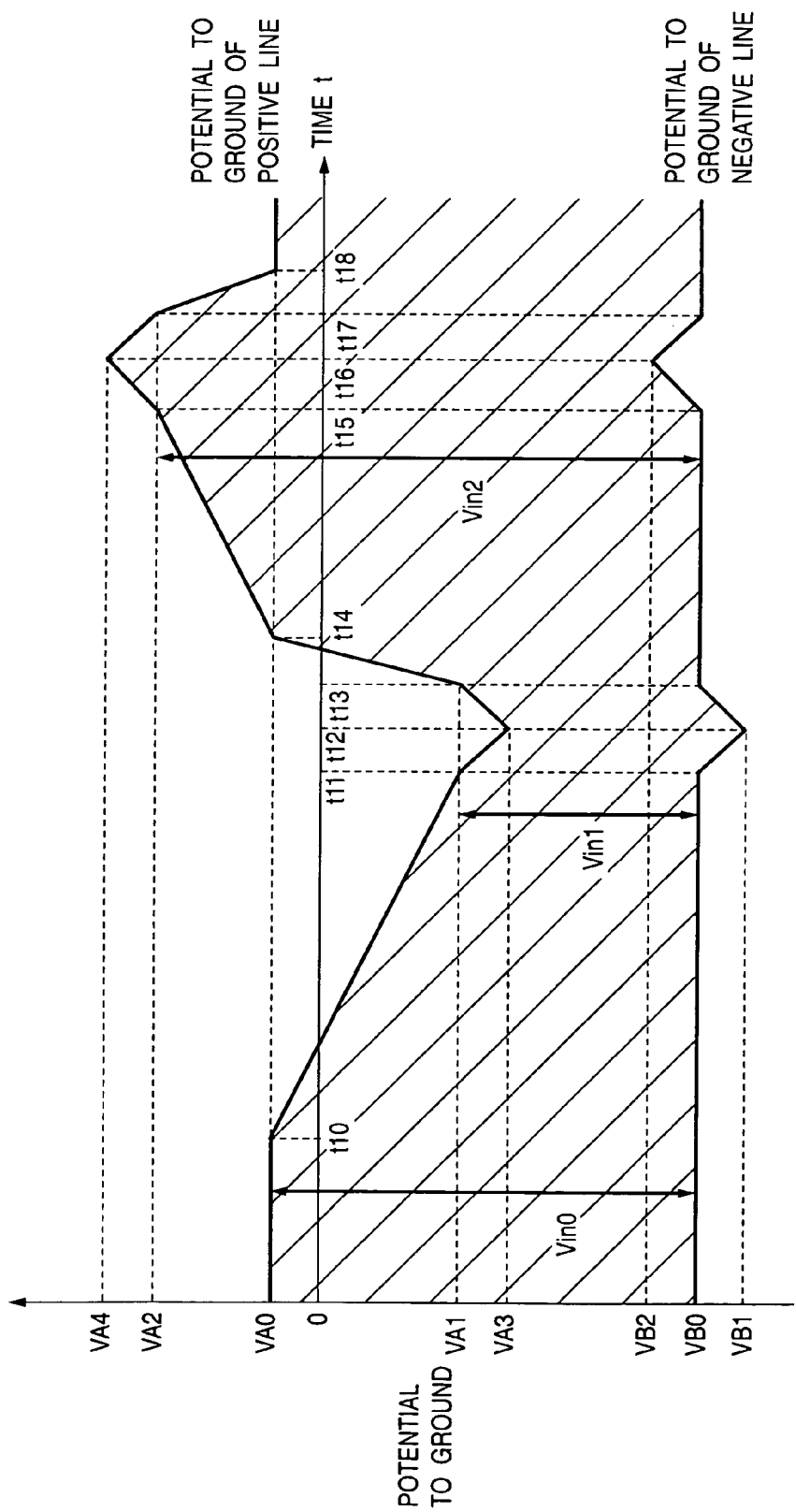
FIG. 7 is a graph showing a change in potential to ground of a solar battery in the second embodiment.

FIG. 7 is a graph showing a variation in potential to ground of a solar battery 1 when both the input voltage and the intermediate voltage are controlled, in which the abscissa represents time, and the ordinate represents the potential to ground of the solar battery 1, as in FIG. 4. Normal operation continues until time t10. During this period, the potential to ground of the positive line of the solar battery 1 is VA0, and that of the negative line of the solar battery 1 is VB0.

Control to vary the potential to ground is executed from the time t10. From the time t10 to t11, an input voltage Vi is dropped from Vin0 to Vin1 at a predetermined rate of change. At the time t11, the potential to ground of the positive line of the solar battery 1 becomes VA1. The potential to ground of the negative line of the solar battery 1 is kept unchanged at VB0.

From the time t11 to t12, an intermediate voltage Vm is boosted from 2VB0 to 2VB1 at a predetermined rate of change. At the time t12, the potential to ground of the positive line of the solar battery 1 becomes VA3. The potential to ground of the negative line of the solar battery 1 becomes VB1.

From the time t12 to t13, the intermediate voltage Vm is dropped from 2VB1 to 2VB0 at a predetermined rate of change. At the time t13, the potential to ground of the positive line of the solar battery 1 becomes VA1. The potential to ground of the negative line of the solar battery 1 returns to VB0.

From the time t13 to t14, the input voltage Vi is quickly boosted from Vin1 to Vin0. At the time t14, the potential to ground of the positive line of the solar battery 1 returns to VA0. The potential to ground of the negative line of the solar battery 1 is kept unchanged at VB0.

From the time t14 to t15, the input voltage Vi is boosted at a predetermined rate of change. At the time t15, the input power has a predetermined value which is close to zero and larger than the non-load loss. At this time, the input voltage Vi is Vin2. The potential to ground of the positive line of the solar battery 1 becomes VA2. The potential to ground of the negative line of the solar battery 1 is kept unchanged at VB0.

From the time t15 to t16, the intermediate voltage Vm is dropped from 2VB0 to 2VB2 at a predetermined rate of change. At the time t16, the potential to ground of the positive line of the solar battery 1 becomes VA4. The potential to ground of the negative line of the solar battery 1 becomes VB2.

From the time t16 to t17, the intermediate voltage Vm is boosted from 2VB2 to 2VB0 at a predetermined rate of change. At the time t17, the potential to ground of the positive line of the solar battery 1 becomes VA2. The potential to ground of the negative line of the solar battery 1 returns to VB0.

From the time t17 to t18, the input voltage Vi is quickly dropped from Vin2 to Vin0. At the time t18, control to vary the potential to ground is temporarily ended. The potential to ground of the positive line of the solar battery 1 returns to VA0. The potential to ground of the negative line of the solar battery 1 is kept unchanged at VB0. From the time t18, normal operation is restored.

In this way, the potential to ground of the solar battery 1 is controlled so the voltage does not come close to zero with respect to the ground potential at each portion of the solar battery 1. Especially, in the system interconnection inverter in which the potential to ground of the negative line is VB1 and the lowest input voltage is Vin1, as shown in FIG. 7, the magnitude of the potential to ground of the solar battery 1 can be made |VA2| or more. For this reason, a ground fault of a predetermined level or more (ground fault resistance value determined by |VA1| and the detection sensitivity of the ground fault detector 13) can be reliably detected. When the open-circuit voltage of the solar battery 1 is as large as Vin2, a potential to ground as large as VA4 can be given to the solar battery 1 by boosting the input voltage Vi and dropping the intermediate voltage Vm. Hence, it can be confirmed that the insulation resistance is maintained with a resistance value larger than the ground fault of the predetermined level or more.

Assume specifications in which the intermediate voltage 2VB1 of the system interconnection inverter 2 is 340 V, the intermediate voltage 2VB2 is 300 V, the lowest input voltage Vin1 is 100 V, and the ground fault detection level of a ground fault detector 13 is 25 mA. When the optimum operating point voltage of the solar battery 1 is 190 V, and the intermediate voltage 2VB1 is 340 V, the potential VB0 to ground of the negative line of the solar battery 1 is −170 V. When the intermediate voltage 2VB2 is 300 V, the potential VB0 to ground of the negative line of the solar battery 1 is −150 V. The input voltage Vin0 in the normal operation mode is 190 V. When the voltage of the solar battery 1 is boosted, and the power is reduced to a predetermined value, the input voltage is about 240 V. That is, the voltage Vin2 is 240 V. At the time t12, the potential VA1 to ground of the positive line is −70 V. At the time t12, the potential VA1 to ground of the positive line is +90 V.

Figure 8:
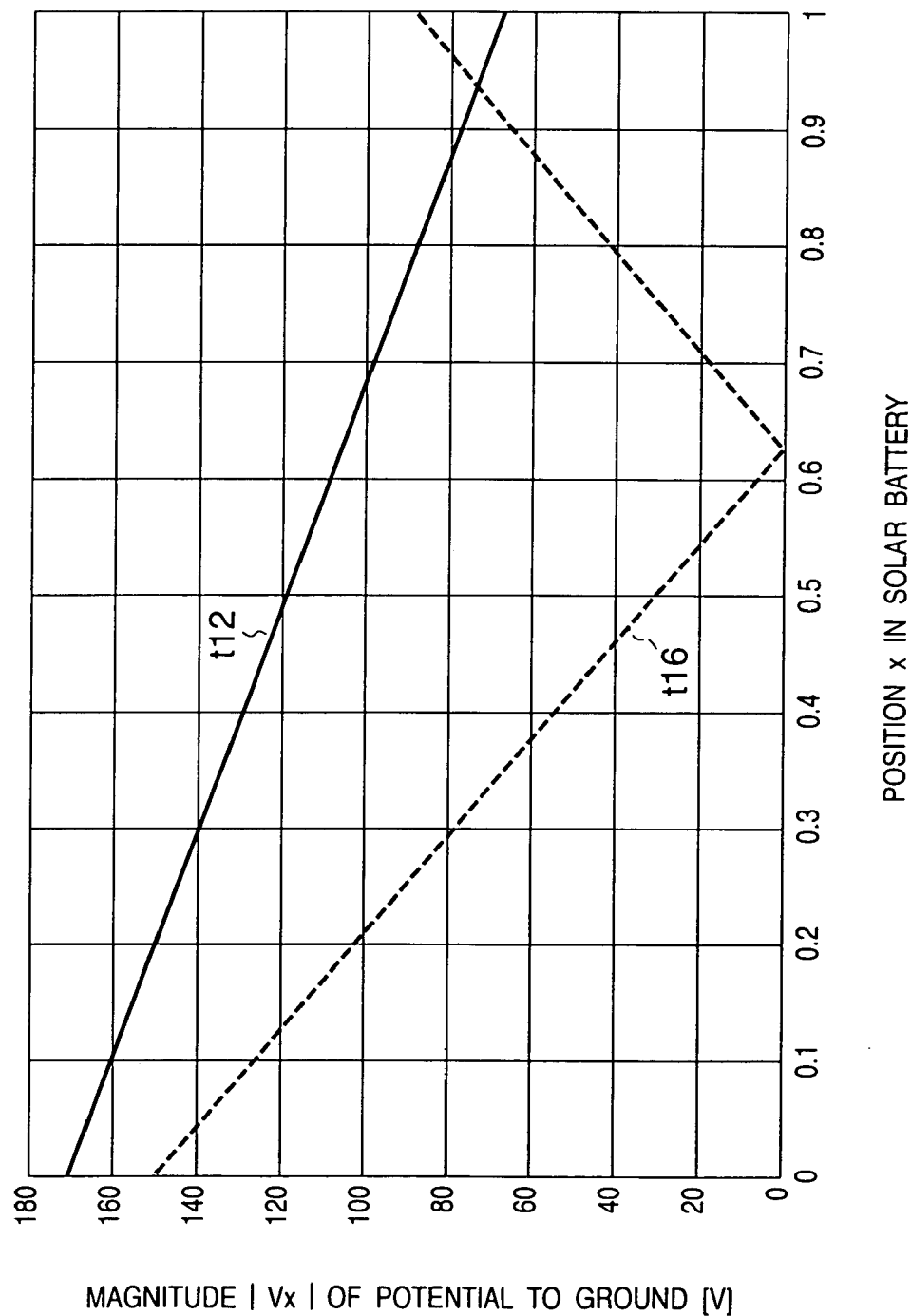
FIG. 8 is a graph showing the magnitudes of the potential to ground at each portion of the solar battery at times t12 and t16 shown in FIG. 7.

As in the first embodiment, when an arbitrary position in the solar battery 1 is represented by x ($0 \leq x \leq 1$), a potential Vx to ground at the position x is given by Vx=Vin×x+VB. FIG. 8 shows the magnitudes |Vx| of the potential to ground at the position x in the solar battery 1 at the times t12 and t16. FIG. 8 is a graph like FIG. 5, in which the abscissa represents the position x in the solar battery 1, and the ordinate represents the magnitude |Vx| of the potential to ground (unit: volt). At the time t12, at least 70 V is ensured as the magnitude |Vx| of the potential to ground, as is indicated by the solid line t12 in FIG. 8. At the time t16, as the magnitude |Vx| of the potential to ground, a value lager than that at the time t12 is ensured in a region where the position x in the solar battery 1 is 0.94 or more, as is indicated by the broken line t16. The minimum magnitude |Vx| of the potential to ground in the solar battery 1 is 76 V at the position x represented by 0.94. This is a much larger value than that in the first embodiment, 66 V. It means that a ground fault with a larger ground fault resistance value can be detected. It also means that a ground fault can be more sensitively detected at all positions in the solar battery 1 as compared to the first embodiment.

As described above, according to the second embodiment, in a system interconnection inverter having non-insulated input and output, the potential to ground of the solar battery is controlled by changing the input voltage and intermediate voltage, and a predetermined value or more except a value close to zero is ensured at all positions in the solar battery as the magnitude of the potential to ground of the solar battery, thereby detecting a ground fault in the dead region, which cannot be detected in normal operation, as in the first embodiment. In addition, since both the input voltage and the intermediate voltage are changed, a ground fault with a larger ground fault resistance value can be detected as compared to a case wherein only the input voltage is changed.

In reducing the intermediate voltage in controlling the potential to ground, control must be performed in consideration of the voltage of a system 3. More specifically, even when the intermediate voltage is dropped, the voltage value must be kept sufficiently larger than the peak value of the AC voltage of the system 3.

Third Embodiment

The third embodiment will be described next. The system interconnection inverter (utility connected inverter) of the third embodiment has the arrangement of a system interconnection inverter (an utility connected inverter) 2 shown in FIG. 1, as in the first embodiment. The potential to ground is controlled by controlling the input voltage, as shown in FIG. 4 of the first embodiment. The distribution of potentials to ground in a solar battery 1 is the same as in FIG. 5. The third embodiment is different from the first embodiment in that a ground fault detector 13 has two ground fault detection levels.

Figure 9:
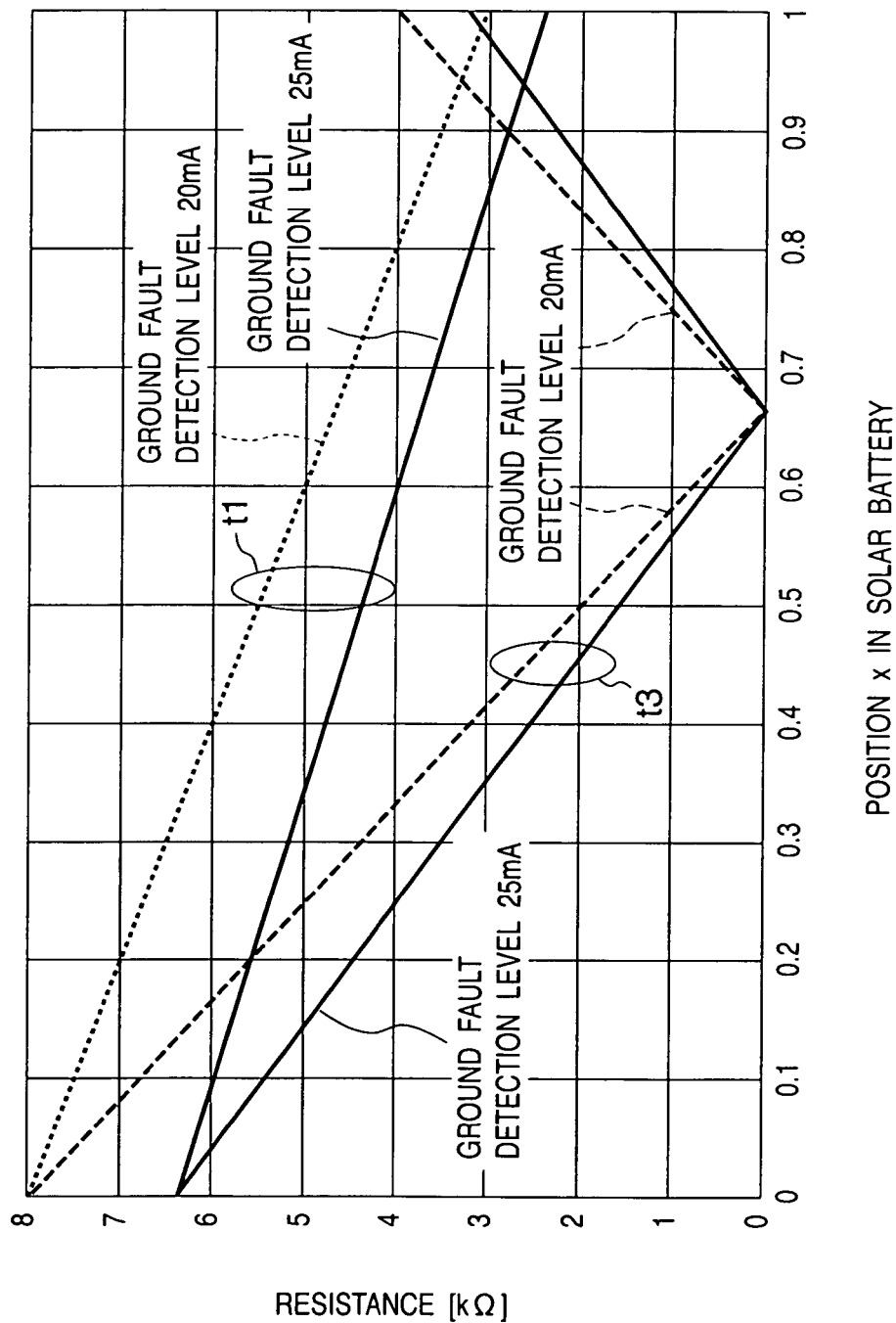
FIG. 9 is a graph showing the boundaries of detectable ground fault resistance values at times t1 and t3 in the third embodiment.

FIG. 9 is a graph showing the boundaries of detectable ground fault resistance values that are obtained from the values shown in FIG. 5 and the ground fault detection levels (25 mA and 20 mA) of the ground fault detector 13. The abscissa represents a position x in the solar battery 1, and the ordinate represents the resistance value between the position x and the ground potential. The two solid lines indicate the detection boundaries at the ground fault detection level of 25 mA. The two broken lines indicate the detection boundaries at the ground fault detection level of 20 mA. Unlike FIG. 6, the two broken lines indicating boundaries for the ground fault detection level of 20 mA are added. The region below each line is a ground fault detectable region, and the region above each line is a ground fault undetectable region. If no ground fault is detected in controlling the potential to ground, a resistance value above all the solid and broken lines is ensured. That is, if no ground fault is detected, a resistance value equal to or larger than the smallest ground fault resistance value of 3.3 kΩ at the position x represented by 0.94 is ensured. Conversely, when the ground fault resistance value is on the lower side of the boundary lines in FIG. 9, a ground fault can be detected.

When a ground fault having a ground fault resistance value Rx is detected at a ground fault detection level It at the position x in the solar battery 1, a potential Vx to ground at the ground fault point is given by Vx≧Rx×It. On the other hand, the potential Vx to ground at the position x is given by Vx=Vin×x+VB, as described in the first embodiment. Thus, we have $$Rx \times It \leq Vin \times x + VB$$

The ground fault detection level It, input voltage Vin, and potential VB to ground of the negative line are known, while two parameters, the ground fault resistance Rx and position x, are unknown. When two of It, Vin, and VB are obtained, the ground fault resistance value Rx and position x can almost be known. Hence, when the potential to ground is controlled, and the input voltages Vin and intermediate voltages Vm at which a ground fault is detected at the ground fault detection levels of 20 mA and 25 mA are detected, the ground fault resistance Rx and its position x are almost obtained. When the detected value of the input voltage Vin or intermediate voltage Vm or the calculated value of the ground fault resistance value Rx or position x, or both of these values are stored in the memory, the user can easily and quickly take a measure after detecting a ground fault.

The ground fault detection levels are not limited to the above values. Not two but three or more ground fault detection levels may be prepared. In this case, since three or more ground fault detection values can be used to estimate the ground fault resistance value Rx and position x, the estimation accuracy improves.

Fourth Embodiment

The fourth embodiment will be described next. The system interconnection inverter (utility connected inverter) of the fourth embodiment has the arrangement of a system interconnection inverter 2 shown in FIG. 1, as in the first embodiment. The potential to ground is controlled by controlling the input voltage, as shown in FIG. 4 of the first embodiment. The distribution of potentials to ground in a solar battery 1 is the same as in FIG. 5. The fourth embodiment is different from the first embodiment in that a ground fault detector 13 outputs a value (to be referred to as a "ground current detection value" hereinafter) I of a detected ground current.

For the ground current detection value I, a relationship Rx×I≦Vin×x+VB holds, as described in the third embodiment. Hence, when two or more of I, Vin, VB are obtained by controlling two or more of arbitrary potentials to ground, a ground fault resistance Rx and ground fault position x can be calculated. When the detected value of the input voltage Vin, intermediate voltage Vm, or ground current detection value I, or the calculated value of the ground fault resistance value Rx or position x, or both of these values are stored in the memory, the user can easily and quickly take a measure after the ground fault detection. In determining a ground fault, a change in ground fault resistance value Rx may be taken into consideration on the basis of log information recorded in the memory when the ground fault is detected.

The minimum number of samples necessary to calculate the ground fault resistance value Rx and ground fault position x is two. When three or more samples are used for calculation, the calculation accuracy can be improved. When the ground current detection value I output from the ground fault detector 13 is a value having a sign, three or more samples that are linearly plotted are used. For example, when three ground current values are I1 (positive), I2 (negative), and I3 (negative), a linear relationship is present. In this case, the ground fault position x is calculated using the relationship Rx×I=Vin×x+VB. If the ground fault detector 13 has, as its detection characteristics, dead regions before and after a ground current value of 0, that a value outside the dead region is output as the ground current detection value I is used as a sample condition.

The methods of controlling the potential to ground in the above embodiments are merely examples, and any other method can be used as long as the input voltage and/or intermediate voltage of the system interconnection inverter is controlled to control the potential to ground to a voltage value other than a value close to zero (or a predetermined or more voltage value) in all regions of the solar battery. As a method of controlling the potential to ground, not the input voltage but only the intermediate voltage may be controlled. In this case, since the input voltage does not deviate from an optimum operating point voltage of the solar battery, the power generation efficiency of the solar battery can be kept high.

As has been described above, according to the above embodiments, the following effects can be obtained.

(1) By controlling, i.e., boosting or dropping the input voltage or intermediate voltage, the potential to ground of each portion of the DC power supply is set to a value other than a value close to zero, thereby reliably detecting a ground fault in the DC power supply.

(2) Since the input voltage or intermediate voltage is controlled such that the potential to ground has a value not close to zero (or the magnitude of the potential to ground has a predetermined value or more) at all positions in the DC power supply, a ground fault at any position can be reliably detected even when a ground fault occurs in the solar battery during interconnection operation.

(3) When only the intermediate voltage is controlled, and a solar battery is used as the DC power supply, the input voltage does not deviate from an optimum operating point voltage of the solar battery. Hence, the power generation efficiency of the solar battery can be kept high.

(4) When no ground fault is detected in controlling the potential to ground, it can be confirmed that a predetermined resistance value is ensured between the solar battery and the ground potential.

(5) Since ground fault detection operation is performed by controlling the potential to ground within the first predetermined time T1, a ground fault can be reliably detected within the first predetermined time T1 after the ground fault has occurred.

(6) Since the interval of control of the potential to ground is set to the second predetermined time T2 or more, electric energy loss due to a decrease in power generation efficiency of the solar battery in controlling the solar battery can be suppressed.

(7) Since the potential to ground is controlled when the input or output power has a predetermined value or less, electric energy loss due to a decrease in power generation efficiency of the solar battery in controlling the solar battery can be suppressed.

(8) Since a ground fault is detected using two or more ground fault detection levels, or a ground current detection value (zero-phase current value) corresponding to a plurality of voltage states is detected, the ground fault position and ground fault resistance value can be estimated and calculated.

(9) Since the ground fault position and ground fault resistance value, or a ground current detection value and the like corresponding to ground fault detection using the above-mentioned two or more detection levels or a plurality of voltage states are recorded on the memory, the user can efficiently take a measure after ground fault detection even when a time has elapsed from the ground fault detection, the ground fault resistance becomes high, and the ground fault position is unknown.

Furthermore, when the input and intermediate voltages are recorded on a memory, the measure after ground fault detection is efficiently performed even if a time has elapsed from the ground fault detection, and the ground fault position is unknown by which the ground resistance becomes high.

(10) When a ground fault is detected, the operation of the system interconnection inverter (utility connected inverter) is stopped, the operation is resumed after a predetermined standby time, and ground fault detection operation of controlling the potential to ground is repeated once or a plurality of number of times, thereby preventing any detection error due to external noise. In addition, when the ground fault state has been canceled can be known.

(11) When the DC power supply is constructed by a plurality of DC power supply units, the potentials to ground in the DC power supply are continuously distributed, and a dead region where the potential to ground becomes zero readily exists. Even in this case, a ground fault at any position in the DC power supply can be detected. In addition, which of the plurality of DC power supply units has the ground fault can be known.

(12) When the DC power supply is a solar battery, it is installed outdoors, and the insulation may be damaged due to some external reason. Additionally, the solar battery can be installed at a variety of positions, including on a rooftop and on a house side. Even in this case, if a ground fault occurs, it can be reliably detected irrespective of its position, and the position of the ground fault can be known.

As many apparently widely different embodiments of the present invention can be made without departing from the spirit and scope thereof, it is to be understood that the invention is not limited to the specific embodiments thereof except as defined in the appended claims.

What is claimed is:

1. A power converting apparatus having a non-insulated converter and a non-insulated inverter to convert direct current power inputted from a power supply to alternating current power, and to supply the alternating current power to a commercial power system which is grounded, said apparatus comprising:
    a detector that detects for a ground fault of the power supply; and
    a controller that controls potential to ground of various points on the power supply by varying an input voltage of the converter and/or an intermediate voltage between the converter and the inverter so that the potential to ground of each point on the power supply becomes a voltage for a detectable ground fault by said detector, while said detector detects for a ground fault, and when the ground fault is detected by said detector, records information related to the ground fault in a memory.

2. The apparatus according to claim 1, wherein the information recorded in the memory includes at least the input voltage or intermediate voltage at the time of ground fault detection.

3. A power converting apparatus having a non-insulated converter and a non-insulated inverter to convert direct current power inputted from a power supply to alternating current power and to supply the alternating current power to a commercial power system which is grounded, said apparatus comprising:
    a detector that detects for a ground fault of the power supply; and
    a controller that controls potential to ground of various points on the power supply by varying an input voltage of the converter and/or an intermediate voltage between the converter and the inverter so that the potential of each point on the power supply becomes a voltage for a detectable ground fault by said detector, while said detector detects for a ground fault,
    wherein said detector detects the ground fault at least at two detection levels, and when the ground fault is detected, said controller records information related to the ground fault in a memory for each detection level.

4. The apparatus according to claim 3, wherein the information recorded in the memory includes at least the input voltage or intermediate voltage at the time of ground fault detection.

5. The apparatus according to claim 3, wherein when the ground fault is detected, said controller predicts a ground fault position and/or a ground fault resistance value on the basis of the input voltage and intermediate voltage for each detection level and records a prediction result in the memory.

6. A power converting apparatus having a non-insulated converter and a non-insulated inverter to convert direct current power inputted from a power supply to alternating current power and to supply the alternating current power to a commercial power system which is grounded, said apparatus comprising:
    a detector that detects for a ground fault of the power supply; and
    a controller that controls potential to ground of various points on the power supply by varying an input voltage of the converter and/or an intermediate voltage between the converter and the inverter so that the potential to ground of each point on the power supply becomes a voltage for a detectable ground fault by said detector, while said detector detects for a ground fault,
    wherein said detector detects the ground fault at least at two detection levels, and upon detecting the ground fault, outputs a ground current value, and when the ground fault is detected, said controller records information related to the ground fault in a memory for each detection level.

7. The apparatus according to claim 6, wherein the information recorded in the memory includes at least the input voltage, intermediate voltage, and ground current value at the time of ground fault detection.

8. The apparatus according to claim 6, wherein when the ground fault is detected, said controller calculates a ground fault position and/or a ground fault resistance value on the basis of the input voltage, intermediate voltage, and ground current value for each detection level and records a calculation result in the memory.

9. A power converting apparatus having a non-insulated converter and a non-insulated inverter to convert direct current power inputted from a power supply to alternating current power and to supply the alternating current power to a commercial power system which is grounded, said apparatus comprising:
    a detector that detects for a ground fault of the power supply; and
    a controller that controls potential to ground of various points on the power supply within a predetermined time T1 by varying an input voltage of the converter and/or an intermediate voltage between the converter and the inverter so that the potential to ground of each point on the power supply becomes a voltage for a detectable ground fault by said detector, while said detector detects for a ground fault.

10. The apparatus according to claim 9, wherein after the potential to ground is controlled, said controller does not control the potential to ground until a predetermined time T2 shorter than the predetermined time T1 has elapsed.

11. A power converting apparatus having a non-insulated converter and a non-insulated inverter to convert direct current power inputted from a power supply to alternating current power and to supply the alternating current power to a commercial power system which is grounded, said apparatus comprising:
- a detector that detects for a ground fault of the power supply; and
- a controller that controls potential to ground of various points on the power supply by varying an input voltage of the converter and/or an intermediate voltage between the converter and the inverter so that the potential to ground of each point on the power supply becomes a voltage for a detectable ground fault by said detector, while said detector detects for a ground fault,
- wherein when the ground fault is detected, said controller stops power supply to the commercial power system, resumes power supply after a predetermined time, and controls the potential to ground to confirm whether a ground fault is detected once or a plurality of number of times.

12. A power converting apparatus having a non-insulated converter and a non-insulated inverter to convert direct current power inputted from a power supply to alternating current power and to supply the alternating current power to a commercial power system which is grounded, said apparatus comprising:
- a detector that detects for a ground fault of the power supply; and
- a controller that controls potential to ground of various points on the power supply by varying an input voltage of the converter and/or an intermediate voltage between the converter and the inverter so that the potential to ground of each point on the power supply becomes a voltage for a detectable ground fault by said detector, while said detector detects for a ground fault,
- wherein said power supply comprises a plurality of direct current power supply units connected in series.

13. A solar power generation apparatus comprising:
- a power supply, which supplies direct current power; and
- a power converting apparatus, which comprises a non-insulated converter and a non-insulated inverter to convert direct current power inputted from said power supply to alternating current power, wherein the alternating current power is supplied to a commercial power system which is grounded, said power converting apparatus further comprises:
- a detector that detects for a ground fault of said power supply; and
- a controller that controls potential to ground of various points on the power supply by varying an input voltage of the converter and/or an intermediate voltage between the converter and the inverter so that the potential to ground of each point on the power supply becomes a voltage for a detectable ground fault by said detector, while said detector detects for a ground fault,
- wherein said power supply comprises a plurality of direct current power supply units connected in series.

14. A solar power generation apparatus comprising:
- a power supply, which supplies direct current power; and
- a power converting apparatus, which comprises a non-insulated converter and a non-insulated inverter to convert direct current power inputted from said power supply to alternating current power, wherein the alternating current power is supplied to a commercial power system which is grounded, and wherein said power converting apparatus further comprises:
- a detector that detects for a ground fault of said power supply; and
- a controller that controls potential to ground of various points on the power supply within a predetermined time Ti by varying an input voltage of the converter and/or an intermediate voltage between the converter and the inverter so that the potential to ground of each point on the power supply becomes a voltage for a detectable ground fault by said detector, while said detector detects for a ground fault.

15. The apparatus according to claim 14, wherein after the potential to ground is controlled, said controller does not control the potential to ground until a predetermined time T2 shorter than the predetermined time T1 has elapsed.

16. A control method of a power converting apparatus which comprises a non-insulated converter and a non-insulated inverter to convert direct current power inputted from a power supply to alternating current power, wherein the alternating current power is supplied to a commercial power system which is grounded, said method comprising the steps of:
- detecting a ground fault of the power supply; and controlling potential to ground of various points on the power supply within a predetermined time T1 by varying an input voltage of the converter and/or an intermediate voltage between the converter and the inverter so that the potential to ground of each point on the power supply becomes a voltage for a detectable ground fault in the detecting step, while a ground fault is detected.

17. The method according to claim 16, wherein after the potential to ground is controlled, the potential to ground is not controlled until a predetermined time T2 shorter than the predetermined time T1 has elapsed.

* * * * *

UNITED STATES PATENT AND TRADEMARK OFFICE
CERTIFICATE OF CORRECTION

| | | |
|---|---|---|
| PATENT NO. | : 7,079,406 B2 | |
| APPLICATION NO. | : 09/818604 | |
| DATED | : July 18, 2006 | |
| INVENTOR(S) | : Seiji Kurokami et al. | |

It is certified that error appears in the above-identified patent and that said Letters Patent is hereby corrected as shown below:

TITLE PAGE:
(56) References Cited, FOREIGN PATENT DOCUMENTS
"09 084254" should read -- 09-084254 --;
"09 285015" should read -- 09-285015 --; and
"2000 023371" should read -- 2000-023371 --.

COLUMN 2:
Line 29, "a, DC" should read -- a DC --.

COLUMN 3:
Lines 17 and 47, "(an" should read -- (a --.

COLUMN 5:
Line 57, "(an" should read -- (a --.

COLUMN 9:
Line 32, "to-the" should read -- to the --.

COLUMN 10:
Line 13, "(an" should read -- (a --.

COLUMN 11:
Line 57, "lager" should read -- larger --.

COLUMN 12:
Line 27, "(an" should read -- (a --.

UNITED STATES PATENT AND TRADEMARK OFFICE
CERTIFICATE OF CORRECTION

PATENT NO. : 7,079,406 B2
APPLICATION NO. : 09/818604
DATED : July 18, 2006
INVENTOR(S) : Seiji Kurokami et al.

It is certified that error appears in the above-identified patent and that said Letters Patent is hereby corrected as shown below:

COLUMN 18:
Line 20, "Ti" should read -- T1 --; and
Line 37, insert a paragraph break before "con-".

Signed and Sealed this

Fourth Day of March, 2008

JON W. DUDAS
*Director of the United States Patent and Trademark Office*